April 25, 1933. V. H. BEST 1,905,407
FISH LURE
Filed July 17, 1931
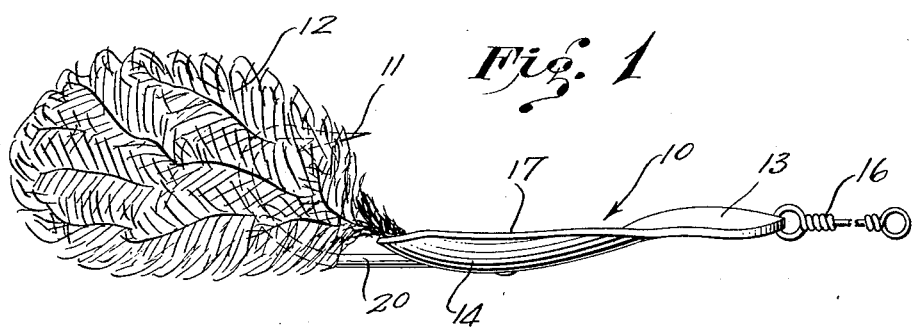
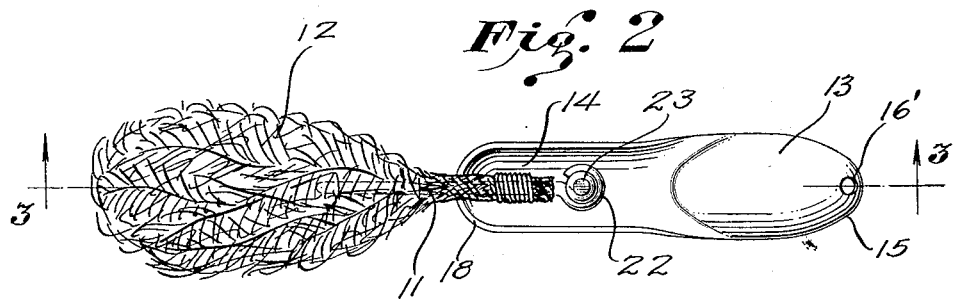
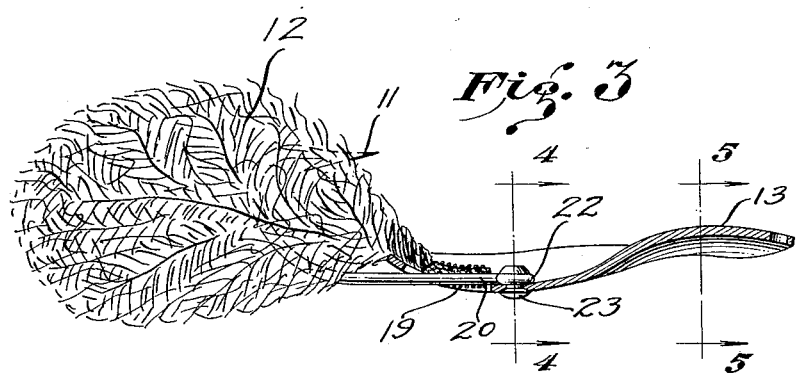
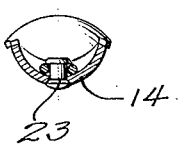
INVENTOR.
VIRGIL H. BEST.
BY
Townsend Loftus & Abbett
ATTORNEYS.

Patented Apr. 25, 1933

1,905,407

UNITED STATES PATENT OFFICE

VIRGIL H. BEST, OF PASADENA, CALIFORNIA

FISH LURE

Application filed July 17, 1931. Serial No. 551,314.

This invention relates to fishing tackle and particularly pertains to a fish lure.

It is the principal object of this invention to provide artificial bait in the from of a lure attached to a fishing hook, and which device, when in the water will appear particularly attractive to fish due to its appearance and the manner in which it darts and moves along a sinuous path of travel.

The present invention contemplates the provision of a spoon having a peculiar longitudinal and transverse configuration whereby it will have a darting action as it is drawn through the water, and which spoon carries a hook and a lure member such as feathers with which the hook is concealed.

The invention is illustrated by way of example in the accompanying drawing, in which:

Figure 1 is a view in side elevation showing the lure with which the present invention is concerned.

Fig. 2 is a view in plan showing the device as disclosed in the previous figure.

Fig. 3 is a view in longitudinal section through the lure as seen on the line 3—3 of Fig. 2.

Fig. 4 is a view in transverse section through the spoon as seen on the line 4—4 of Fig. 3.

Fig. 5 is a view in transverse section through the spoon as seen on the line 5—5 of Fig. 3.

Referring more particularly to the drawing, 10 indicates a metallic spoon which carries a hook 11 and an artificial bait or lure 12, here shown as made of feathers.

The advantages obtained by the present invention are particularly concerned with the spoon plate, which as shown in Fig. 3 is formed with a longitudinal reverse curve to produce a forward concaved portion 13 merging into a rearwardly extending convexed portion 14. The surfaces referred to are the under-faces of the spoon, since they are the ones which contact with the water in a manner to control the path of travel of the spoon.

The forward concaved portion 13 has a rounded nose 15, receiving a lead line 16 which line is connected to the spoon through a perforation 16' lying at a point on the longitudinal center of the spoon.

The concaved portion 13 is not only concaved longitudinally of the spoon, but is also concaved transversely, as more particularly shown in Fig. 5 of the drawing.

The convexed portion 14 of the spoon extends rearwardly for a distance substantially the same as that of the concaved portion, and is also convexed transversely as shown in Fig. 4 of the drawing.

It will thus be evident that the edge 17 of the spoon will be substantially straight and that the convex and concave portions will protrude upon opposite sides of the plane of this edge.

Attention is also directed to the fact that the width of the convexed portion 14 is somewhat less than the width of the concaved portion 13, giving a stream line effect to the spoon.

The end of the convexed portion is rounded as indicated at 18. An opening 19 is formed through the convexed portion 14 to receive the shank 20 of a fishing hook 11. The eye 22 of this shank receives a rivet 23 by which the hook may be secured into position. Fastened to the shank of the hook and extending upwardly over the rear edge 18 is the artificial bait 12, which is here shown as being feathers secured to the shank of the hook by its shaft and with its barbs extending outwardly around the body of the hook to conceal the point of the hook and the barb of the hook, and thru its flexibility to represent the tail of a small fish.

In operation of the present invention, the lure is assembled as shown in the drawing, and attached to the lead 16 of a fish line. After it has been cast into the water it will tend to gravitate within the water or may be drawn through the water by the fisherman. In either event, the forward end of the spoon will tend to skim upon the water due to its concavity and as it moves upon or through the water will tend to roll sidewise, and alternately dart from side to side as it rolls and as it pursues its path of travel. This movement will attract the attention of the fish and cause them to pursue the darting object and to catch it.

It will thus be seen that the simple device here shown provides a desirable fish lure.

While I have shown the preferred form of my invention as now known to me, it will be understood that various changes may be made in combination, construction, and arrangement of parts by those skilled in the art without departing from the spirit of my invention as claimed.

Having thus described my invention, what I claim and desire to secure by Letters Patent is:

1. A fish lure including a hook, a spoon plate of substantially uniform thickness secured thereto and extending longitudinally of the shank thereof, said spoon plate being characterized by a continuous reverse curve throughout the length of its body and along its longitudinal center whereby the plate will generally form a longitudinally extending concaved and convexed section throughout its length, said concaved and convexed sections being laterally concaved and convexed respectively, the lateral and longitudinal concavity and convexity merging along the center of the spoon, and the marginal edges of the spoon lying in substantially a common plane.

2. A fish lure including a hook, a spoon plate of substantially uniform thickness secured thereto and extending longitudinally of the shank thereof, said spoon plate being characterized by a continuous reverse curve throughout the length of its body and along its longitudinal center whereby the plate will generally form a longitudinally extending concaved and convexed section throughout its length, said concaved and convexed sections being laterally concaved and convexed respectively, the lateral and longitudinal concavity and convexity merging along the center of the spoon, and artificial bait carried by the structure to carry the hook.

3. A fish lure including a hook, a spoon plate of substantially uniform thickness secured thereto and extending longitudinally of the shank thereof, said spoon plate being characterized by a continuous reverse curve throughout the length of its body and along its longitudinal center whereby the plate will generally form a longitudinally extending concaved and convexed section throughout its length, said concaved and convexed sections being laterally concaved and convexed respectively, the lateral and longitudinal concavity and convexity merging along the center of the spoon, and artificial bait carried by the structure to carry the hook, said bait and hook extending from one end of the spoon plate, the opposite end of said plate being formed with a perforation to receive a lead line.

4. A fish lure including a hook, a spoon plate formed of thin sheet metal of substantially uniform thickness and to which the hook is secured, said sheet metal plate having a continuous reverse curve extending full length of the longitudinal center of the plate, the forward end of the plate forming a relatively wide rounded nose convexed above the longitudinal horizontal median line of the plate and the remaining portion of the plate being formed with a portion concaved below said median line, said concaved portion having relatively parallel sides and being of lesser width than the width of the forward convexed portion, and means attached to the nose of the convexed portion of the plate to secure it to a line.

5. A fish lure including a hook, a spoon plate formed of thin sheet metal of substantially uniform thickness and to which the hook is secured, said sheet metal plate having a continuous reverse curve extending full length of the longitudinal center of the plate, the forward end of the plate forming a relatively wide rounded nose convexed above the longitudinal horizontal median line of the plate and the remaining portion of the plate being formed with a portion concaved below said median line, said concaved portion having relatively parallel sides and being of lesser width than the width of the forward convexed portion, the terminating portion of the concaved end of the plate being upturned and being formed in longitudinal alignment with the central axis of the plate, and means attached to the nose of the convexed portion of the plate to secure it to a line.

VIRGIL H. BEST.